(12) United States Patent
Yan et al.

(10) Patent No.: US 9,088,379 B2
(45) Date of Patent: Jul. 21, 2015

(54) SERVICE TRANSMISSION PROCESSING METHOD, NODE DEVICE AND NETWORK SYSTEM

(75) Inventors: Jun Yan, Shenzhen (CN); Gen Chen, Shenzhen (CN); Bo Zhang, Shenzhen (CN); Da He, Shenzhen (CN); Yu Zeng, Chengdu (CN); Ling Pei, Shenzhen (CN); Wei Tan, Shenzhen (CN); Min Chen, Shenzhen (CN); Xin Xiao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 851 days.

(21) Appl. No.: 13/289,712

(22) Filed: Nov. 4, 2011

(65) Prior Publication Data
US 2012/0051736 A1    Mar. 1, 2012

Related U.S. Application Data

(63) Continuation of application No. PCT/CN2010/072174, filed on Apr. 24, 2010.

(30) Foreign Application Priority Data

May 6, 2009 (CN) .......................... 2009 1 0140406

(51) Int. Cl.
*H04B 10/00* (2013.01)
*H04J 3/16* (2006.01)
*H04J 14/00* (2006.01)

(52) U.S. Cl.
CPC ......... *H04J 3/1652* (2013.01); *H04J 2203/006* (2013.01)

(58) Field of Classification Search
CPC ........... H04B 10/0771; H04B 10/0791; H04B 10/0797
See application file for complete search history.

(56) References Cited

U.S. PATENT DOCUMENTS

| 2004/0156325 | A1* | 8/2004 | Perkins et al. ............. 370/299 |
| 2008/0304822 | A1 | 12/2008 | Bianchi et al. |
| 2009/0175618 | A1 | 7/2009 | Yan |
| 2013/0121685 | A1* | 5/2013 | Rao et al. ........................ 398/17 |

FOREIGN PATENT DOCUMENTS

| CN | 1874201 A | 12/2006 |
| CN | 1983931 A | 6/2007 |

(Continued)

OTHER PUBLICATIONS

Extended European Search Report issued in corresponding European Patent Application No. 10771997.3, mailed Feb. 3, 2012.

(Continued)

*Primary Examiner* — Daniel Dobson
(74) *Attorney, Agent, or Firm* — Brinks Gilson & Lione (57) ABSTRACT

Embodiments of the present invention disclose a service transmission processing method, a node device and a network system are provided. One method includes: receiving service data after relay processing by a 3R relay node, where the relay processing includes terminating and regenerating an Optical Channel (OCh) of the service data, and when the OCh is terminated, transparent transmission is performed on an Optical channel Transport Unit (OTU); and performing defect detection on a path of the OTU to obtain a detection result of the path of the OTU. Another method includes: obtaining an overhead in an Optical Transport Network (OTN) frame; and judging whether the overhead includes a Client Signal Fail (CSF) inserted after a signal fails, and if the overhead includes the CSF, determining a path where a defect occurs according to the CSF.

11 Claims, 5 Drawing Sheets

(56) References Cited

FOREIGN PATENT DOCUMENTS

| | | |
|---|---|---|
| CN | 101030844 A | 9/2007 |
| CN | 101179350 A | 5/2008 |
| EP | 1411665 A1 | 4/2004 |
| EP | 1826926 A1 | 8/2007 |
| WO | WO 2008031356 A1 | 3/2008 |

OTHER PUBLICATIONS

Written Opinion of the International Searching Authority issued in corresponding PCT Patent Application No. PCT/CN2010/072174, mailed Jul. 29, 2010.

International Search Report issued in corresponding PCT Patent Application No. PCT/CN2010/072174, mailed Jul. 29, 2010.

* cited by examiner

SERVICE TRANSMISSION PROCESSING METHOD, NODE DEVICE AND NETWORK SYSTEM

CROSS-REFERENCE TO RELATED APPLICATIONS

This application is a continuation of International Application No. PCT/CN2010/072174, filed on Apr. 24, 2010, which claims priority to Chinese Patent Application No. 200910140406.9, filed with the Chinese Patent Office on May 6, 2009 and entitled "SERVICE TRANSMISSION PROCESSING METHOD, NODE DEVICE AND NETWORK SYSTEM", the contents of which are all incorporated herein by reference in their entireties.

FIELD OF THE INVENTION

The present invention relates to the field of communication technologies, and in particular, to a service transmission processing method, node device and network system.

BACKGROUND OF THE INVENTION

An Optical Transport Network (OTN) is a new optical transport technology, and with the development of the OTN technology, various protection manners are used in the optical network at present. The OTN generally includes a working channel and a protection channel, and when a switching condition occurs (for example, the working channel or the protection channel is faulty), the switching occurs between the working channel and the protection channel.

Figure 1:
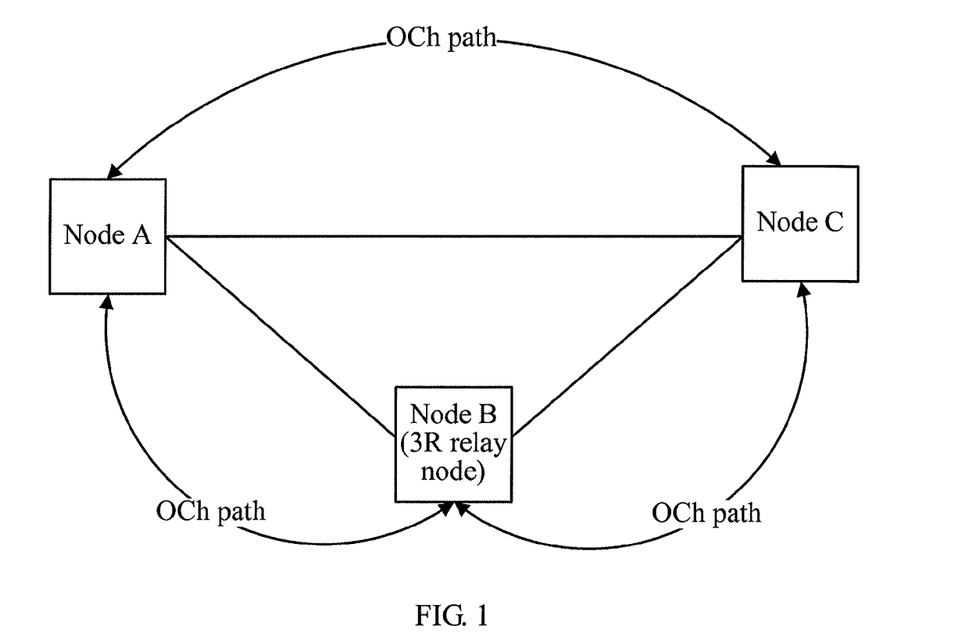
FIG. 1 is a schematic diagram of a manner for processing OCh transmission in the prior art.

Several manners for processing Optical Channel (OCh) transmission exist in the prior art. One of the manners is that a defect of the OCh and a defect of an Optical channel Transport Unit (OTUk) are used as switching conditions, and the OTUk and the OCh are terminated and regenerated at the same time. After the defect of the OCh and the defect of the OTUk are detected, the switching is triggered. FIG. 1 is a schematic diagram of a manner for processing OCh transmission in the prior art. It is supposed that, a working channel and a protection channel exist between a node A and a node C, the working channel is an OCh path, and the protection channel includes two OCh paths: One is from node A to a node B, and the other one is from node B to node C, where node B is a 3R relay node. Node B uses the detected defects (the defect of the OCh and the defect of the OTUk) between node A and node B as the switching condition, and node C uses the detected defects (the defect of the OCh and the defect of the OTUk) between node B and node C as the switching condition.

In the research and practice of the prior art, the inventor finds that the prior art at least has the following problems. In the service transmission processing method in the prior art, the switching may be triggered only when node C detects the defect of the OCh and the defect of the OTUk between node B and node C at the same time. However, node C cannot detect the defects between node A and node B, so the current service transmission processing method needs to be improved.

SUMMARY OF THE INVENTION

Embodiments of the present invention provide a service transmission processing method, a node device and a network system, which are capable of improving a service transmission processing process.

In order to solve the above technical problems, the embodiments provided by the present invention are implemented through the following technical solutions.

A service transmission processing method includes:

receiving service data after relay processing by a 3R relay node, where the relay processing includes terminating and regenerating an OCh of the service data, and when the OCh is terminated, transparent transmission is performed on an OTU; and performing defect detection on a path of the OTU to obtain a detection result of the path of the OTU.

A service transmission processing method includes:

obtaining an overhead in an OTN frame; and judging whether the overhead includes a Client Signal Fail (CSF) inserted after a signal fails, and if the overhead includes the CSF, determining a path where a defect occurs according to the CSF.

A node device includes:

a receiving unit, configured to receive service data after relay processing by a 3R relay node, where the relay processing includes terminating and regenerating an OCh of the service data, and when the OCh is terminated, transparent transmission is performed on an OTU; and a detection unit, configured to perform defect detection on a path of the OTU to obtain a detection result of the path of the OTU.

A node device includes:

an obtaining unit, configured to obtain an overhead in an OTN frame; and a processing unit, configured to judge whether the overhead includes a CSF inserted after a signal fails, and if the overhead includes the CSF, determine a path where a defect occurs according to the CSF.

A network system includes:

a first node device, configured to send service data;

a relay node device, configured to perform relay processing on the received service data, where the relay processing includes terminating and regenerating an OCh of the service data, and when the OCh is terminated, transparent transmission is performed on an OTU; and a second node device, configured to receive the service data sent from the relay node, and perform defect detection on a path of the OTU to obtain a detection result of the path of the OTU.

A network system includes:

a first node device, configured to monitor received service data, and if a signal failure is detected, insert a CSF into an overhead in an OTN frame; and a second node device, configured to obtain the overhead in the OTN frame sent from the first node device, judge whether the overhead includes the CSF, and if the overhead includes the CSF, determine a path where a defect occurs according to the CSF.

A node device includes:

a receiving unit, configured to receive service data; and a termination unit, configured to terminate an OCh of the service data, and perform transparent transmission on an OTU.

It can be seen from the above technical solutions that, according to the embodiments of the present invention, the relay processing is performed through the 3R relay node, where the relay processing includes the terminating and regenerating the OCh of the service data, and when the OCh is terminated, the transparent transmission is performed on the OTU. According to the transparent transmission performed on the OTU, the defect of the path of the OTU different from a current protection scope may be detected, thereby providing reference for a subsequent process of the service transmission processing, and further improving the service transmission processing method.

BRIEF DESCRIPTION OF THE DRAWINGS

To illustrate the technical solutions in the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art may obtain other drawings according to the accompanying drawings without creative efforts.

DETAILED DESCRIPTION OF THE EMBODIMENTS

Technical solutions in the embodiments of the present invention will be clearly and completely described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts should fall within the protection scope of the present invention.

An embodiment of the present invention provides a service transmission processing method, which is capable of providing more reasonable processing in the service transmission.

Figure 2:
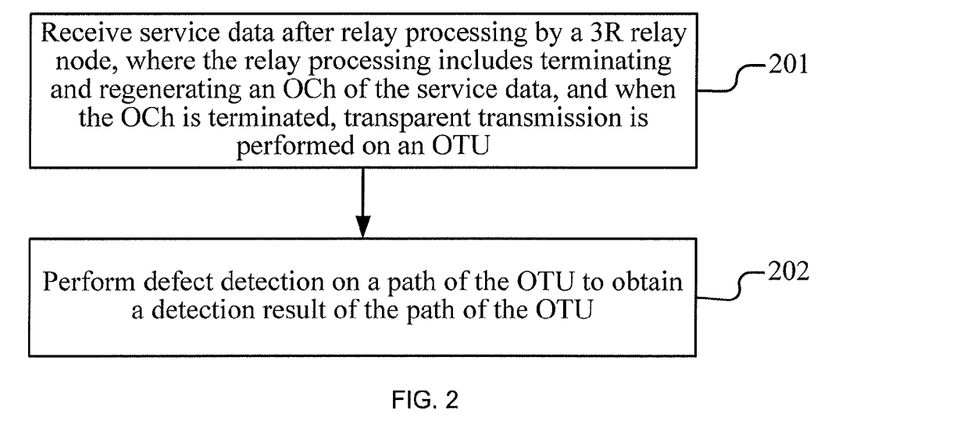
FIG. 2 is a flow chart of a service transmission processing method according to Embodiment 1 of the present invention.

FIG. 2 is a flow chart of a service transmission processing method according to Embodiment 1 of the present invention, which includes the following steps.

Step 201: Receive service data after relay processing by a 3R relay node, where the relay processing includes terminating and regenerating an OCh of the service data, and when the OCh is terminated, transparent transmission is performed on an OTU.

Step 202: Perform defect detection on a path of the OTU to obtain a detection result of the path of the OTU.

In the terminating and regenerating the OCh of the service data, when the OCh is terminated, the performing the transparent transmission on the OTU may be as follows: When decapsulation is performed on the service data, after decapsulation between the OCh and the OTU is completed, decapsulation between the OTU and an Optical channel Data Unit (ODU) is not performed; when re-encapsulation is performed on the decapsulated service data, the OTU is encapsulated into the OCh. The OTU may not be further decapsulated during the termination, so the OTU is directly used as a basic unit during the regeneration. According to all the embodiments of the present invention, for simplicity, the termination and regeneration of the 3R relay node is referred to as the transparent transmission performed on the OTU.

After the obtaining the detection result of the path of the OTU, the method further includes: if the detection result of the path of the OTU is that a defect exists, triggering switching protection at the OTU layer.

It can be seen from the content of this embodiment that, according to the embodiment of the present invention, the relay processing is performed through the 3R relay node, where the relay processing includes the terminating and regenerating the OCh of the service data, and when the OCh is terminated, the transparent transmission is performed on the OTU. According to the transparent transmission performed on the OTU, the defect of the path of the OTU different from a current protection scope may be detected, thereby providing reference for a subsequent process of the service transmission processing, and further improving the service transmission processing method.

Figure 3:
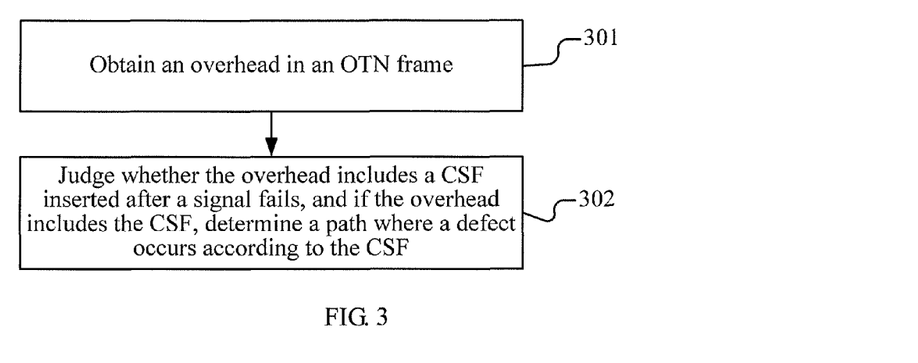
FIG. 3 is a flow chart of a service transmission processing method according to Embodiment 2 of the present invention.

An embodiment of the present invention further provides a service transmission processing method. FIG. 3 is a flow chart of a service transmission processing method according to Embodiment 2 of the present invention, which includes the following steps.

Step 301: Obtain an overhead in an OTN frame.

The overhead in the OTN frame may be a frame overhead in a Payload Structure Identifier (PSI) in a frame header part of the OTN frame, or other overheads in the frame header part, such as an OTUk overhead.

Step 302: Judge whether the overhead includes CSF inserted after a signal fails, and if the overhead includes the CSF, determine a path where a defect occurs according to the CSF.

The determining the path where the defect occurs according to the CSF includes: determining that the path where the defect occurs according to the CSF is a path located before a node inserted with CSF.

After the determining the path where the defect occurs according to the CSF, the method further includes: according to the case that the path where the defect occurs is the path located before a node inserted with CSF, determining that a switching is not performed on the path after the node inserted with CSF.

It can be seen from the foregoing content that, in the embodiment of the present invention, it is judged whether the overhead includes the CSF inserted after the signal fails through obtaining the overhead in the OTN frame, and therefore, the defects at different layers may be detected, thereby providing reference for a subsequent process of the service transmission processing, and further improving the service transmission processing method.

The technical solutions of the present invention are further described in detail in the following.

The defects of the OCh referred in the embodiment of the present invention include, for example, a Loss of signal Payload (LOS-P), a Forward Defect Indication Payload (FDI-P), a Forward Defect Indication Overhead (FDI-O) and an Open Connection Indication (OCI).

The defects of the OTUk include, for example, an OTUk Trail trace identifier mismatch (OTUk_TIM), an OTUk Degraded defect (OTUk_DEG), and an OTUk Backward defect indicator (OTUk_BDI).

Figure 4:
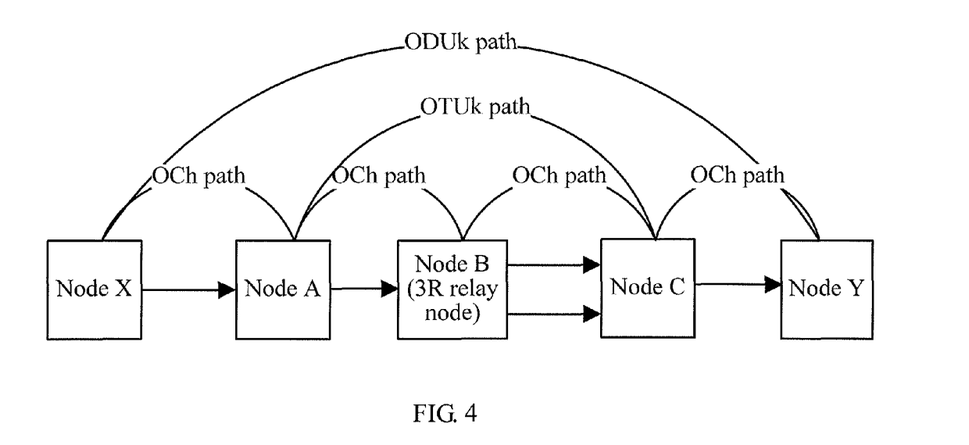
FIG. 4 is a schematic diagram of a service transmission processing method according to Embodiment 3 of the present invention.

FIG. 4 is a schematic diagram of a service transmission processing method according to Embodiment 3 of the present invention.

As shown in FIG. 4, nodes X, Y, A, B and C in a system are OTN device nodes, where node B is a 3R relay node. A working channel is disposed between node A and node B, and a protection channel and an working channel are disposed between node B and node C. Service data is sent from node A to node B, and then is sent to node C after the 3R relay by node B, and is finally sent to node Y from node C.

Specifically, the service transmission process as shown in FIG. 4 includes the following.

(1) Node A sends the service data sent from node X to node B.

(2) Node B performs the 3R relay on the service data, and then sends the service data to node C.

If node X needs to send the service data to node A, one OCh path respectively exists between node X and node A, between node A and node B, between node B and node C, and between node C and node Y, and one ODUk path exists between node X and node Y. According to the improvement on the 3R relay node in the embodiment of the present invention, functions of node B used as the 3R relay node are updated, and one OTUk exists between node A and node C, that is, the OTUk is not terminated and regenerated at node B, and therefore, the path of the OTUk crosses node B, and an OTUk path is formed between node A and node C (A-B-C).

In the embodiment of the present invention, the 3R relay node provides new 3R functions, in addition to the compensation on degradation of an Optical Signal Noise Ratio (OSNR), the main difference is that the layers of the termination and regeneration are different.

Figure 5:
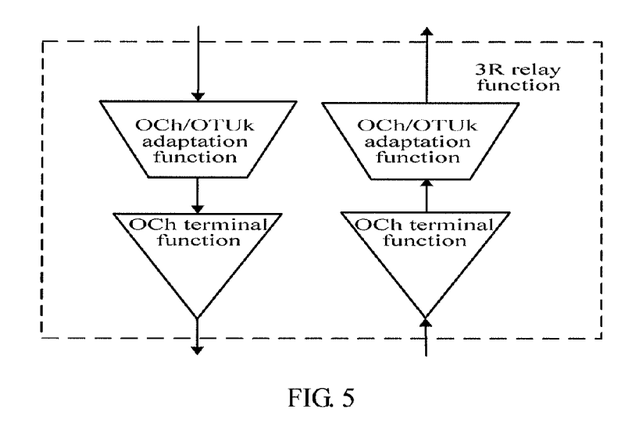
FIG. 5 is a schematic diagram of an atomic function model with a new 3R function according to an embodiment of the present invention.

FIG. 5 is a schematic diagram of an atomic function model with a new 3R function according to an embodiment of the present invention. In the atomic function model, generally, an oval represents a connection function, triangle represents a terminal function, and a trapezoid represents an adaptation function (the function of receiving a signal is an adaptation destination function, and the function of sending a signal is an adaptation source function). As shown in FIG. 5, the new 3R function includes the OCh/OTUk adaptation function in the trapezoid, and the OCh terminal function in the triangle.

According to the new 3R function referred in the embodiment of the present invention, the OCh is still terminated and regenerated at the 3R relay node (the termination may be understood as decapsulation, and the regeneration may be understood as re-encapsulation), but the OTUk is not terminated and regenerated, and therefore, the transparent transmission may be performed on the OTUk by crossing the 3R relay node.

Specifically, the relay performed on the service data by the 3R relay node may be as follows: The received service data is decapsulated, the overhead part is removed from the service data at the OCh layer to obtain the OTUk, and at this time, the overhead is not removed from the OTUk to obtain the ODU, which is different from the prior art. When the re-encapsulation is performed, it is not required to perform the process of adding the overhead part to the ODU to obtain the OTUk, but the overhead part is directly added to the OTUk to obtain the OCh.

In this way, the path of the OTUk and the path of the OCh do not fall within the same protection scope. For example, in FIG. 4, according to the current 3R function, the OCh and the OTUk are terminated and regenerated between each adjacent nodes, that is, node A and node B are used as one OCh path, and also used as one OTUk path; and node B and node C are used as one OCh path, and also used as one OTUk path. At this time, the protection scopes of the OTUk path and the OCh path are the same. However, according to the new 3R function, the OTUk path may cross the 3R node, that is, as shown in FIG. 4, the OTUk path crosses node B, and then one OTUk path exists between node A and node C (A-B-C), and in this way, the protection scopes of the OCh layer and the OTUk layer are different.

(3) Node C detects the defects at various layers, and determines whether the switching protection is required according to the detection result.

Node C may perform the defect detection on the path of the OCh (OCh path) of the service data, and obtains the detection result of the OCh path according to the OCh parameters such as a payload signal and an OCI; and performs the defect detection on the path of the OTU (OTUk path), and obtains the detection result of the OTUk path according to the OTUk parameters such as a trail trace identifier.

That is to say, the defects of the paths at various layers detected by node C may include the OCh defect between node B and node C, and the OTUk defect between node A and node C. The scope between node B and node C, for example, is required to be protected, and the protection at the OCh layer may be merely used at this time, and then the OCh defect is merely detected since the path at the OTUk layer is different from the path at the OCh layer after the new 3R function is used, and therefore, the defect of the OTUk may not be used as the triggering condition of the OCh layer protection. That is to say, if the OCh defect is detected at node C, it may be considered that problems occur between node B and node C, and the OCh defect may be used as the triggering condition of the OCh layer protection between node B and node C. If the defect at the OCh layer cannot be detected at node C, it may be considered that the condition between node B and node C is normal.

In addition, the OCh generally has a monitoring function for monitoring a Client Signal Fail (SF) of the OCh path. The embodiment of the present invention further put forward that, in addition to the defect monitoring of the SF of the OCh path, the overheads of the OTUk such as unused bytes are used to monitor Signal Degrade (SD) of an electric layer, including error code monitoring in the OCh path scope. The used overhead is regenerated at a source node of the OCh path, and is terminated at a destination node of the OCh path. The overhead carries the information related to the signals and set by the source node, and the information may be identified through values of the bytes in the overhead. The destination node may detect whether an error code occurs by comparing the related information set by the source node in the overhead with the information corresponding to the current node, and the detection result of the error code may be considered as the OCh defect and used as the condition of switching the SD. At this time, the protection scope of the OCh path is consistent with the monitoring scope of the overhead, thereby solving the problem that the OCh layer cannot monitor the error code.

Therefore, in this embodiment, when a user needs to configure the protection of the path between node A and node C, the defect of the OTUk fully conforming to the protection scope may be used as the switching condition. When the user needs to configure the protection of the path between node B and node C, the defect of the OCh fully conforming to the protection scope may be used as the switching condition. In addition, the overhead of the OTUk (for example, the bytes not defined in the overhead of the OTUk) may be used at the same time to perform error code monitoring on the scope of the OCh path.

Figure 6:
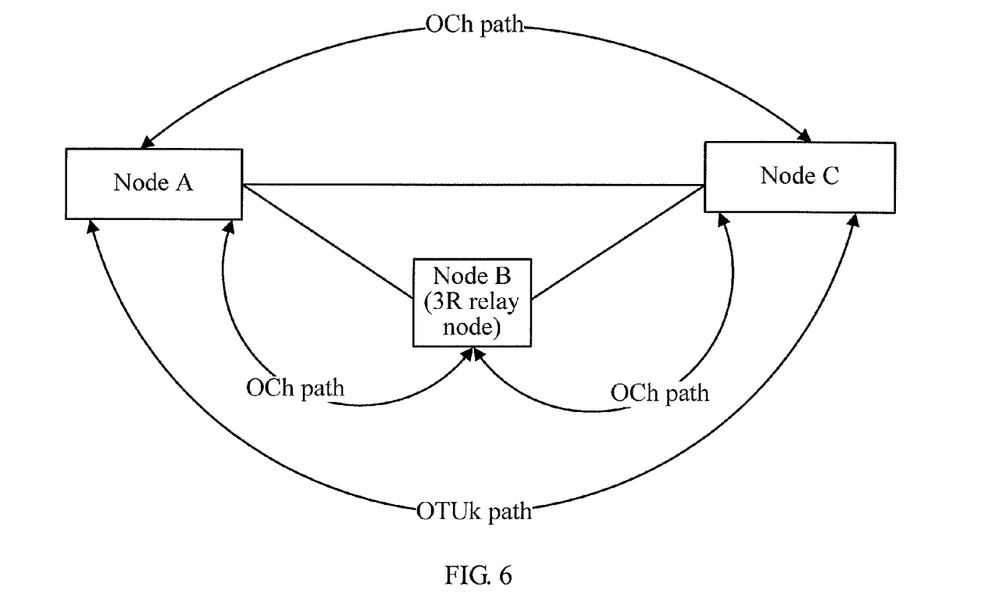
FIG. 6 is a schematic diagram of a service transmission processing method according to Embodiment 4 of the present invention.

FIG. 6 is a schematic diagram of a service transmission processing method according to Embodiment 4 of the present invention.

As shown in FIG. 6, a system includes nodes A, B and C. A working channel and a protection channel exist between node A and node C. The working channel is an OCh path, and the protection channel includes two OCh paths: One is from node A to node B, and the other one is from node B to node C, where node B is a 3R relay node. Specifically, the service transmission process as shown in FIG. 6 includes the following.

(1) Node B receives service data sent from node A.

(2) Node B performs 3R relay on the service data, and then sends the service data to node C.

One OTUk path exists among the nodes A, B and C. According to the new 3R function referred to in the embodiment of the present invention, the OTUk path is not terminated and regenerated at node B, and therefore, the OTUk path crosses node B, and one OTUk path is formed between node A and node C (A-B-C).

For the process of relaying the service data by the 3R relay node, reference may be made to the description in Embodiment 3, which is not described in detail here again.

(3) Node C detects the defects of various layers, and determines whether the switching protection is required according to the detection result.

Node C may perform the defect detection on the path of the OCh (OCh path) of the service data, and obtains the detection result of the OCh path according to the OCh parameters such as a payload signal and an OCI; and then performs the defect detection on the path of the OTU (OTUk path), and obtains the detection result of the OTUk path according to the OTUk parameters such as a trail trace identifier.

That is to say, the defects of the paths in various layers detected by node C may include the OCh defect between node B and node C, and the OTUk defect between node A and node C. The path between node A and node C, for example, is required to be protected, and the protection at the OTUk layer may be merely used at this time, and the monitoring the OTUk defect is used as the switching condition since the path at the OTUk layer is different from the path at the OCh layer after the new 3R function is used, and therefore, the OCh defect may not be used as a triggering condition of the OTUk layer protection. That is to say, if the OTUk defect is detected at node C, it may be considered that problems occur between node A and node C, and the OTUk defect may be used as the triggering condition of the OTUk layer protection between node A and node C. If the OTUk defect cannot be detected at node C, it may be considered that the condition between node A and node C is normal. In addition, the OCh layer is a service layer of the OTUk layer, and the path range of the OCh layer (AB or BC) is in the path range of the OTUk (ABC), so it may be considered that the OCh defect is used as the triggering condition of the OTUk layer protection.

Figure 7:
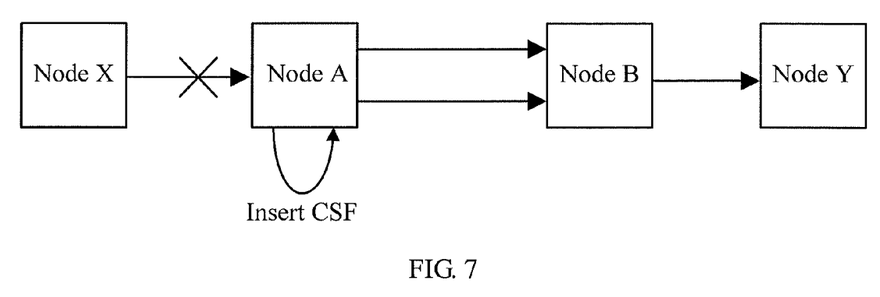
FIG. 7 is a schematic diagram of a service transmission processing method according to Embodiment 5 of the present invention.

FIG. 7 is a schematic diagram of a service transmission processing method according to Embodiment 5 of the present invention.

As shown in FIG. 7, nodes X, Y, A and B in a system are OTN device nodes. A working channel is disposed between node X and node A, and a protection channel and a working channel are disposed between node A and node B.

In the embodiment of the present invention, the defects between the nodes are judged by using a CSF.

The service transmission process as shown in FIG. 7 includes the following.

(1) Node A monitors the process of sending the service data from node X, and if it is detected that the service data is not received, that is, a signal failure occurs, insert the CSF into an overhead of an OTN frame to send to node B.

It is supposed that, a failure occurs between node X and node A, node A monitors the process of sending the service data from node X, and if it is detected that the service data is not received, that is, a signal failure occurs, insert the CSF into the overhead of the OTN frame to send to node B.

The process of inserting the CSF into the overhead is as follows.

Figure 8:
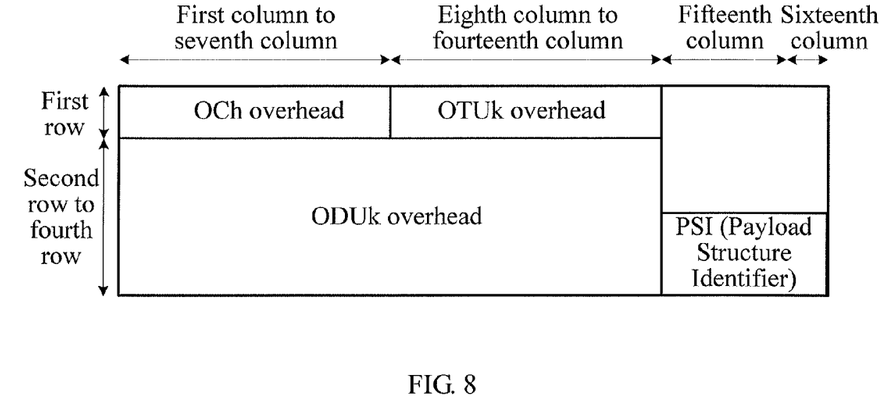
FIG. 8 is a schematic structure diagram of a frame header of an OTN frame according to Embodiment 5 of the present invention.

A frame header of the OTN frame includes different overhead parts, such as an OCh overhead, an OTUk overhead, and ODUk overhead and a frame overhead, where the position of the frame overhead may be set on the position of a PSI in the OTN frame. As shown in FIG. 8, FIG. 8 is a schematic structure diagram of a frame header of an OTN frame according to Embodiment 5 of the present invention. The first column to the seventh column in the first row are the OCh overhead; the eighth column to the fourteenth column in the first row are the OTUk overhead; the first column to the fourteenth column in the second and third rows are the ODUk overhead; and the fifteenth column in the fourth row is the PSI.

In the embodiment of the present invention, the CSF is delivered through the PSI. Each one bit in a certain byte in a multi-frame of the PSI such as a certain byte between the PSI [18] to the PSI [255] represents a state of a client layer signal in a path, for example, the value 0 represents that the client layer signal in the path is normal, and the value 1 represents that the client layer signal in the path is failed, or the opposite meaning is used for indication. In a default condition, the insertion of 0 represents that the client layer signal is normal. Definitely, other overheads in the OTN frame structure may also be used to deliver the CSF. It is generally required to fast insert the CSF into the PSI after several frames or several milliseconds when the insertion is determined. For example, after a Severe Signal Fail (SSF) delivered by other functional entities is received, Optical Data Unit of level k Path/XXX Adaptation Source function (ODUkP/XXX_A_So, XXX represents a certain client service) fast inserts the CSF into the PSI after several frames or several milliseconds.

In addition, as for the device not supporting the foregoing functions, 0x00 may be directly inserted into the overhead of the unused OTN frame, so that it may be considered that the client layer signal is normal if a receiving end supports the foregoing functions, and in this way, the device supporting the foregoing functions and the device not supporting the foregoing functions may be interconnected.

(2) Node B determines whether switching protection is required according to the CSF.

If node B detects the CSF, it may be determined that the problems occur out of the protection scope (A-B), that is, the problems belong to the problems between node X and node A, and the problems affect the working channel and the protection channel between node A and node B at the same time, so that the working channel and the protection channel between node A and node B cannot be used. Thereby, whether node B finds the problems between node A and node B according to the OCh defect or the OTUk defect or not, the switching protection may not occur, thereby avoiding wrong switching protection.

The service transmission processing method according to the embodiments of the present invention is described in detail in the foregoing description, and correspondingly, an embodiment of the present invention provides a node device and a network system.

Figure 9:
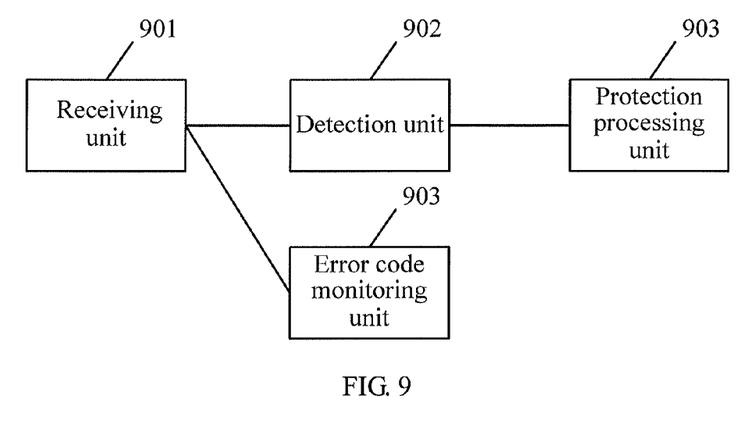
FIG. 9 is a schematic structure diagram of a node device 1 according to an embodiment of the present invention.

FIG. 9 is a schematic structure diagram of a node device 1 according to an embodiment of the present invention.

As shown in FIG. 9, the node device includes a receiving unit 901 and a detection unit 902.

The receiving unit 901 is configured to receive service data after relay processing by a 3R relay node, where the relay processing includes terminating and regenerating an OCh of the service data, and when the OCh is terminated, transparent transmission is performed on an OTU.

The detection unit 902 is configured to perform defect detection on the path of the OTU to obtain a detection result of the path of the OTU.

The path of the OTU is a path crossing the 3R relay node.

In the terminating and regenerating the OCh of the service data, when the OCh is terminated, the performing the transparent transmission on the OTU may be as follows: When decapsulation is performed on the service data, after the decapsulation between the OCh and the OTU is completed, the decapsulation between the OTU and an ODU is not performed; when re-encapsulation is performed on the decapsulated service data, the OTU is encapsulated into the OCh.

The node device further includes: a protection processing unit 903, configured to trigger switching protection at the OTU layer after the detection unit 902 detects that a defect exists in the path of the OTU.

Before the detection unit 902 performs the defect detection on the path of the OTU, the detection unit 902 further performs the defect detection on the path of the OCh. The protection processing unit 903 triggers the switching protection at the OCh layer after the detection unit 902 detects that the defect exists in the path of the OCh.

The node device also includes: an error code monitoring unit 904, configured to obtain an error code monitoring result of the path of the OCh according to the comparison between the stored information and information set in the overhead of the OTU by the 3R relay node.

Figure 10:
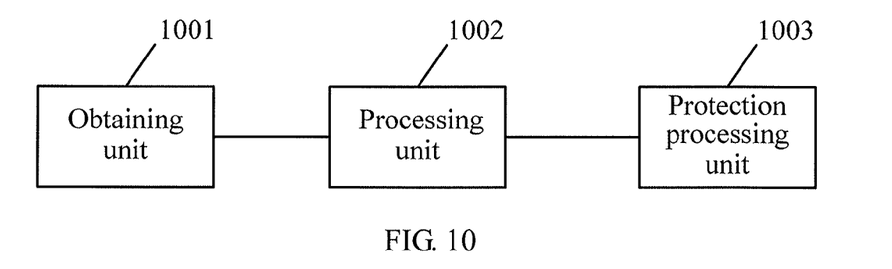
FIG. 10 is a schematic structure diagram of a node device 2 according to an embodiment of the present invention.

FIG. 10 is a schematic structure diagram of a node device 2 according to an embodiment of the present invention.

As shown in FIG. 10, the node device includes an obtaining unit 1001 and a processing unit 1002.

The obtaining unit 1001 is configured to obtain an overhead in an OTN frame.

The processing unit 1002 is configured to judge whether the overhead includes a CSF inserted after a signal fails, and if the overhead includes the CSF, determine a path where a defect occurs according to the CSF.

The node device further includes a protection processing unit 1003, configured to determine that the switching is not performed on the path after the node inserted with CSF when the processing unit 1002 determines that the path where a defect occurs is the path before the node inserted with CSF.

Figure 11:
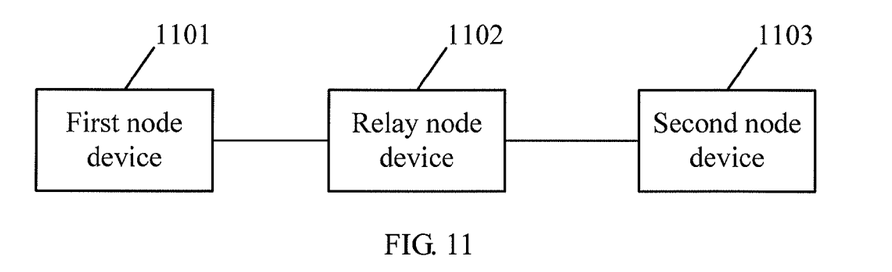
FIG. 11 is a schematic structure diagram of a network system 1 according to an embodiment of the present invention.

FIG. 11 is a schematic structure diagram of a network system 1 according to an embodiment of the present invention.

As shown in FIG. 11, the network system includes a first node device 1101, a relay node device 1102 and a second node device 1103.

The first node device 1101 is configured to send service data.

The relay node device 1102 is configured to perform relay processing on the received service data, where the relay processing includes terminating and regenerating an OCh of the service data, and when the OCh is terminated, transparent transmission is performed on an OTU to send the service data after the relay processing.

The second node device 1103 is configured to receive the service data sent from the relay node, and perform defect detection on a path of the OTU to obtain a detection result of the path of the OTU.

The second node device 1103 has a structure as shown in FIG. 9, and as for the details, reference may be made to the foregoing description, which is not described in detail here again.

Figure 12:
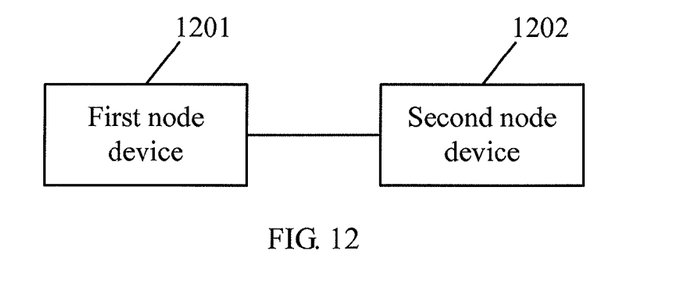
FIG. 12 is a schematic structure diagram of a network system 2 according to an embodiment of the present invention.

FIG. 12 is a schematic structure diagram of a network system 2 according to an embodiment of the present invention.

As shown in FIG. 12, the network system includes a first node device 1201, and a second node device 1202.

The first node device 1201 is configured to monitor received service data, and if a signal failure is detected, insert a CSF into an overhead in an OTN frame.

The second node device 1202 is configured to obtain the overhead in the OTN frame sent from the first node device 1201, judge whether the overhead includes the CSF, and if the overhead includes the CSF, determine a path where the defect occurs according to the CSF.

The second node device 1202 has a structure as shown in FIG. 10, and as for the details, reference is made to the foregoing description, which is not described in detail here again.

A node device includes:
a receiving unit, configured to receive service data; and
a termination unit, configured to terminate an OCh of the service data, and perform transparent transmission on an OTU. The termination unit specifically includes: a decapsulation unit, configured to not perform decapsulation between the OTU and an ODU after completing decapsulation between the OCh and the OTU; and an encapsulation unit, configured to encapsulate the OTU into the OCh when re-encapsulation is performed on the decapsulated service data.

The node device may further include:
a detection unit, configured to perform the defect detection on the path of the OCh, and if it is detected that a defect exists in the path of the OCh, trigger switching protection at the OCh layer.

To sum up, according to the embodiments of the present invention, the relay processing is performed through the 3R relay node, where the relay processing includes terminating and regenerating the OCh of the service data, and when the OCh is terminated, the transparent transmission is performed on the OTU. According to the transparent transmission performed on the OTU, the defect of the path of the OTU different from a current protection scope may be detected, thereby providing reference for a subsequent process of the service transmission processing, and further improving the service transmission processing method.

Those of ordinary skill in the art may understand that all or a part of the steps in the method of the above embodiment may be realized by instructing relative hardware with programs.

The programs may be stored in a computer readable storage medium, such as a read only memory (ROM), a magnetic disk, or an optical disk.

The service transmission processing method, the node device and the network system are introduced in detail in the forgoing, and specific examples are applied here to set forth the principle and implementation of the present invention, and the forgoing illustration of the embodiments is only used to help in understanding the method and core idea of the present invention. Meanwhile, persons of ordinary skill in the art may make modifications and variations to the present invention in terms of the specific implementations and application scopes according to the ideas of the present invention. Therefore, the specification shall not be constructed as limitations to the present invention.

What is claimed is:

1. A service transmission processing method, comprising:
    receiving service data after relay processing by a 3R relay node, wherein the relay processing comprises terminating and regenerating an Optical Channel (OCh) of the service data, and when the OCh is terminated, transparent transmission is performed on an Optical channel Transport Unit (OTU); and
    performing defect detection on a path of the OTU to obtain a detection result of the path of the OTU.

2. The service transmission processing method according to claim 1, wherein
    the path of the OTU is a path crossing the 3R relay node.

3. The service transmission processing method according to claim 1, wherein in the terminating and regenerating the OCh of the service data, when the OCh is terminated, the performing the transparent transmission on the OTU comprises:
    not performing decapsulation between the OTU and an Optical channel Data Unit (ODU) after completing decapsulation between the OCh and the OTU during decapsulation of the service data; and
    encapsulating the OTU into a new OCh when re-encapsulation is performed on the decapsulated service data.

4. The service transmission processing method according to claim 3, wherein
    before the performing the defect detection on the path of the OTU, the method further comprises: performing the defect detection on the path of the OCh, and if a defect is detected in the path of the OCh, triggering switching protection at the OCh layer.

5. The service transmission processing method according to claim 1, wherein
    after the obtaining the detection result of the path of the Path of the OTU, the method further comprises: if the detection result of the path of the OTU is that a defect exists, triggering switching protection at the OTU layer.

6. The service transmission processing method according to claim 1, further comprising:
    obtaining an error code monitoring result of the path of the OCh according to comparison between stored information and information set in an overhead of the OTU by the 3R relay node.

7. A node device, comprising at least an instruction hardware that executes instruction codes stored in a non-transitory computer readable medium which causes the node device to:
    receive service data after relay processing by a 3R relay node, wherein the relay processing comprises terminating and regenerating an Optical Channel (OCh) of the service data, and when the OCh is terminated, transparent transmission is performed on an Optical channel Transport Unit (OTU); and
    perform defect detection on a path of the OTU to obtain a detection result of the path of the OTU.

8. The node device according to claim 7, wherein
    the terminating and regenerating of the OCh of the service data received by the receiving unit by the 3R relay node comprises:
    not performing, by the 3R relay node, decapsulation between the OTU and an Optical channel Data Unit (ODU) after completing decapsulation between the OCh and the OTU during decapsulation of the service data; and encapsulating, by the 3R relay node, the OTU into a new OCh when re-encapsulation is performed on the decapsulated service data.

9. The node device according to claim 7, the node device is caused to:
    trigger switching protection at the OTU layer after detecting that a defect exists in the path of the OTU.

10. The node device according to claim 9, wherein:
    before performing the defect detection on the path of the OTU, the node device is caused to: perform the defect detection on the path of the OCh; and
    after detecting that the defect exists in the path of the OCh in the detection unit, the node device is caused to trigger switching protection at the OCh layer.

11. The node device according to claim 7, the node device is caused to:
    obtain an error code monitoring result of the path of the OCh according to comparison between stored information and information set in an overhead of the OTU by the 3R relay node.

* * * * *